United States Patent Office 2,729,605
Patented Jan. 3, 1956

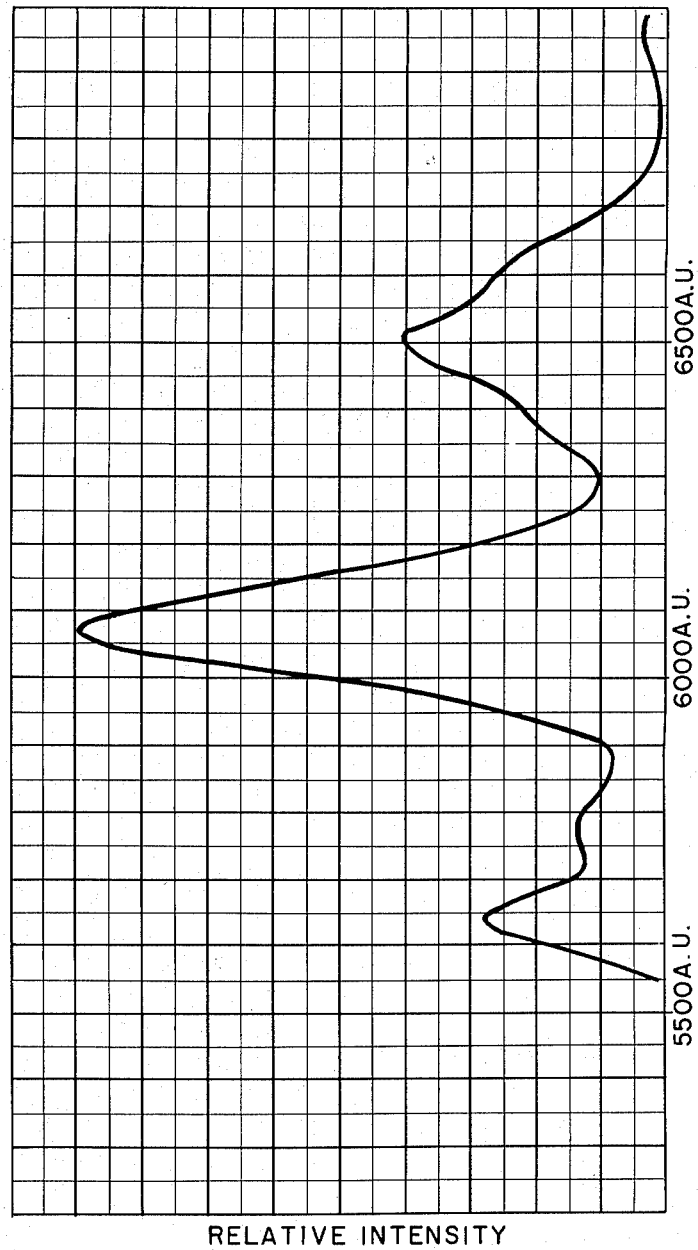

2,729,605

SAMARIUM ACTIVATED LANTHANUM OXYCHLORIDE PHOSPHOR

Frank Evans Swindells, Maplewood, N. J., assignor to E. I. du Pont de Nemours and Company, Wilmington, Del., a corporation of Delaware Application March 23, 1953, Serial No. 344,122

5 Claims. (Cl. 252—301.4)

This invention relates to lanthanum oxychloride phosphors which exhibit red fluorescence. More particularly it relates to samarium-activated lanthanum oxychloride phosphors and to their preparation.

Various lanthanum compounds having luminescent properties are known. To the best of applicant's knowledge they have not enjoyed any commercial use. Many of the known lanthanum compounds which have luminescent properties are salts of organic acids and/or contain water of crystallization which makes them not suitable to withstand the high temperatures necessary to make phosphors which are useful in high vacuum tube manufacture. Infra-red lanthanum phosphors are known and they are made from lanthanum oxysulfide which has been activated with a double activator consisting of europium coupled with various other heavy metals and indium coupled with copper or one of such metals. These infra-red phosphors have limited technical uses.

It has been found that lanthanum oxychloride can be activated with a samarium compound to form efficient phosphors which are useful in color television tubes. The proportion of the samarium activator may vary from approximately 0.001 to 0.1 atom of samarium per mol of lanthanum oxychoride.

The novel samarium-activated lanthanum oxychloride phosphors can be made by heating lanthanum oxychloride with the activating samarium compound to a temperature between 600° C. to 1200° C. for a period of ten minutes to 20 hours, preferably ½ to 10 hours. The lanthanum oxychloride may be prepared previously, or in situ, as a part of the baking or calcining operation, wherein the samarium phosphor is formed. The lanthanum oxychloride and/or activating samarium oxychloride can be formed in situ from the oxides or carbonates of lanthanum, and/or samarium, respectively, by treatment with hydrogen chloride or ammonium chloride.

A practical procedure for making a samarium-activated lanthanum oxychloride phosphor consists of dissolving lanthanum oxide and samarium oxide in hydrochloric acid, evaporating the solution to dryness, adding water, again evaporating the solution to dryness, heating the dry admixture at a temperature about 400° C. for about one hour, pulverizing the product, and baking it at about 600° C., pulverizing the resulting product and calcining it for 10 to 120 minutes or longer, at a temperature between 800 and 1100° C. The initial heating and pulverizing steps, while advantageous, can be eliminated and the last step only used. Afterwards, the product can be ground and screened.

The samarium-activated lanthanum oxychloride phosphors obtainable from the foregoing process and containing the above amounts of samarium exhibit intense orange-red fluorescence when excited by cathode rays and relatively weak fluorescence when excited by X-rays or ultraviolet light. The emission curve of the samarium-activated phosphor, when excited by cathode rays, is shown in the figure of the accompanying drawing which constitutes a part of this specification.

The invention will be further illustrated but is not intended to be limited by the following examples.

EXAMPLE I

Lanthanum oxide (6.5 gms.) and 0.1 gm. of samarium trioxide were dissolved in 35 ml. of 1–1 hydrochloric acid, the solution was evaporated to dryness, 5 ml. of water was added and the resulting solution was likewise evaporated to dryness. The dry admixture was then baked for one hour at a temperature of 400° C. and the product was pulverized and screened through 200-mesh nylon bolting cloth. The screened product was calcined for one hour at approximately 600° C. then pulverided and the product was calcined for one hour at about 1000° C. The resulting product had an intense orange-relatively weak fluorescence when excited by cathode rays and relatively weak fluorescence when excited by X-rays or ultraviolet light.

EXAMPLE II

Lanthanum oxychloride (7.6 gms.) is ground with 0.12 gm. of samarium oxychloride and 5 ml. of water in a mortar, then evaporated to dryness. The dry product is ground to a powder, calcined 16 hours at 600° C., reground and calcined one hour at 1000° C. The product has essentially the same properties as that prepared according to Example I.

EXAMPLE III

Lanthanum oxide (3.25 gms.), 0.05 gm. of samarium oxide, 3 gms. of ammonium chloride and 10 ml. of water are ground together, the water then evaporated and the mixture heated one hour at 400° C. The resulting mass is ground and calcined for one hour at 1000° C. The product is similar to that obtained in Example I.

An advantage of the present invention is that it provides a new type of phosphor. A further advantage is that the invention provides a new class of activated lanthanum oxychloride phosphors. Another advantage is that it provides red fluorescing phosphors having high efficiency and good stability. They can be used as a red component in three-color television tubes or may be blended with other phosphors and used in black and white television screens. The phosphors also have the advantage that they are useful in oscillograph and radar tubes. The phosphors are useful as substitutes for red fluorescent zinc phosphate, calcium silicate and magnesium silicate. A further advantage of the invention is that the process is simple and does not require any special apparatus.

What is claimed is:

1. A samarium-activated lanthanum oxychloride phosphor.

2. A samarium-activated lanthanum oxychloride phosphor containing 0.001 to 0.1 atom of samarium per mol of said oxychloride.

3. The process of preparing a lanthanum oxychloride phosphor which comprises heating lanthanum oxychloride with an activating samarium compound therefor to a temperature from 600° C. to 1200° C. for a period of at least ten minutes.

4. The process of preparing a lanthanum oxychloride phosphor which comprises heating lanthanum oxychloride with an activating samarium compound therefor to a temperature from 600° C. to 1200° C. for a period from one to 20 hours.

5. A process of preparing a lanthanum oxychloride phosphor which comprises dissolving lanthanum oxide and samarium oxide in an activating amount of 0.001 to 0.1 atom of samarium per mol of lanthanum oxychloride in hydrochloric acid, evaporating the solution to dryness, adding water, again evaporating the solution to dryness, heating the product at a temperature of about 400° C. for about one hour, reducing the product to a powder, and heating it to a temperature of about 600° C. for about one hour, reducing the product to a powder, and calcining it at 800° C. to 1100° C. for ten to 120 minutes.

References Cited in the file of this patent

UNITED STATES PATENTS 2,567,769    Head  ---------------- Sept. 11, 1951

OTHER REFERENCES

Pringsheim-Fluorescence and Phosphorescence Publishers, Inc., 1949, pp. 471, 472.